March 13, 1956  F. E. UNDERWOOD  2,738,196
SAND SPREADER
Filed Feb. 17, 1951  5 Sheets-Sheet 1
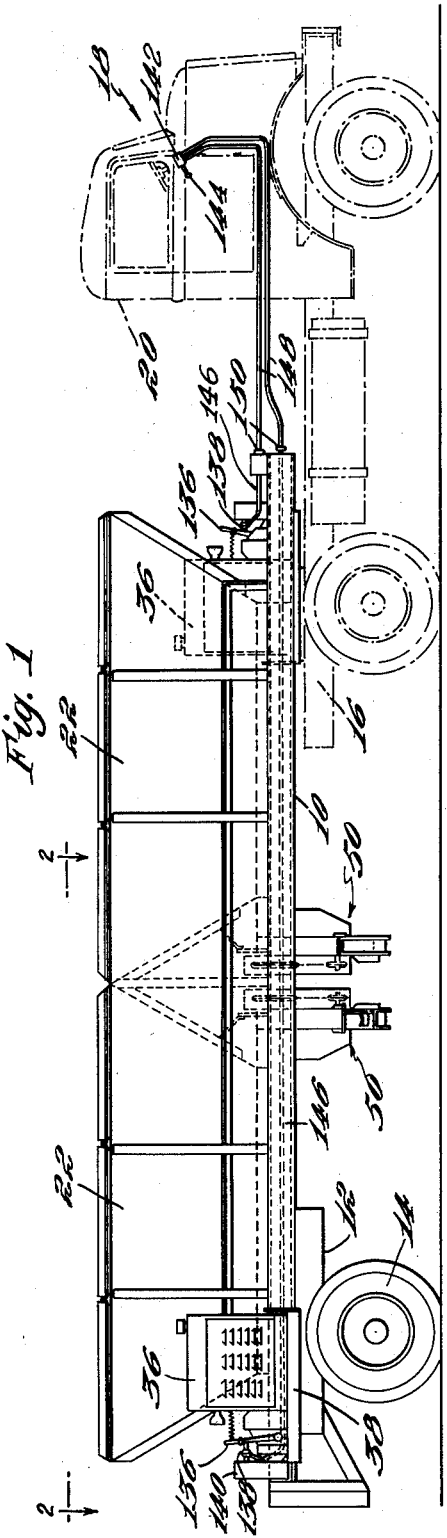
Inventor
Frank E. Underwood
by Roberts, Cushman & Grover
Att'ys.

March 13, 1956 F. E. UNDERWOOD 2,738,196
SAND SPREADER
Filed Feb. 17, 1951 5 Sheets-Sheet 2
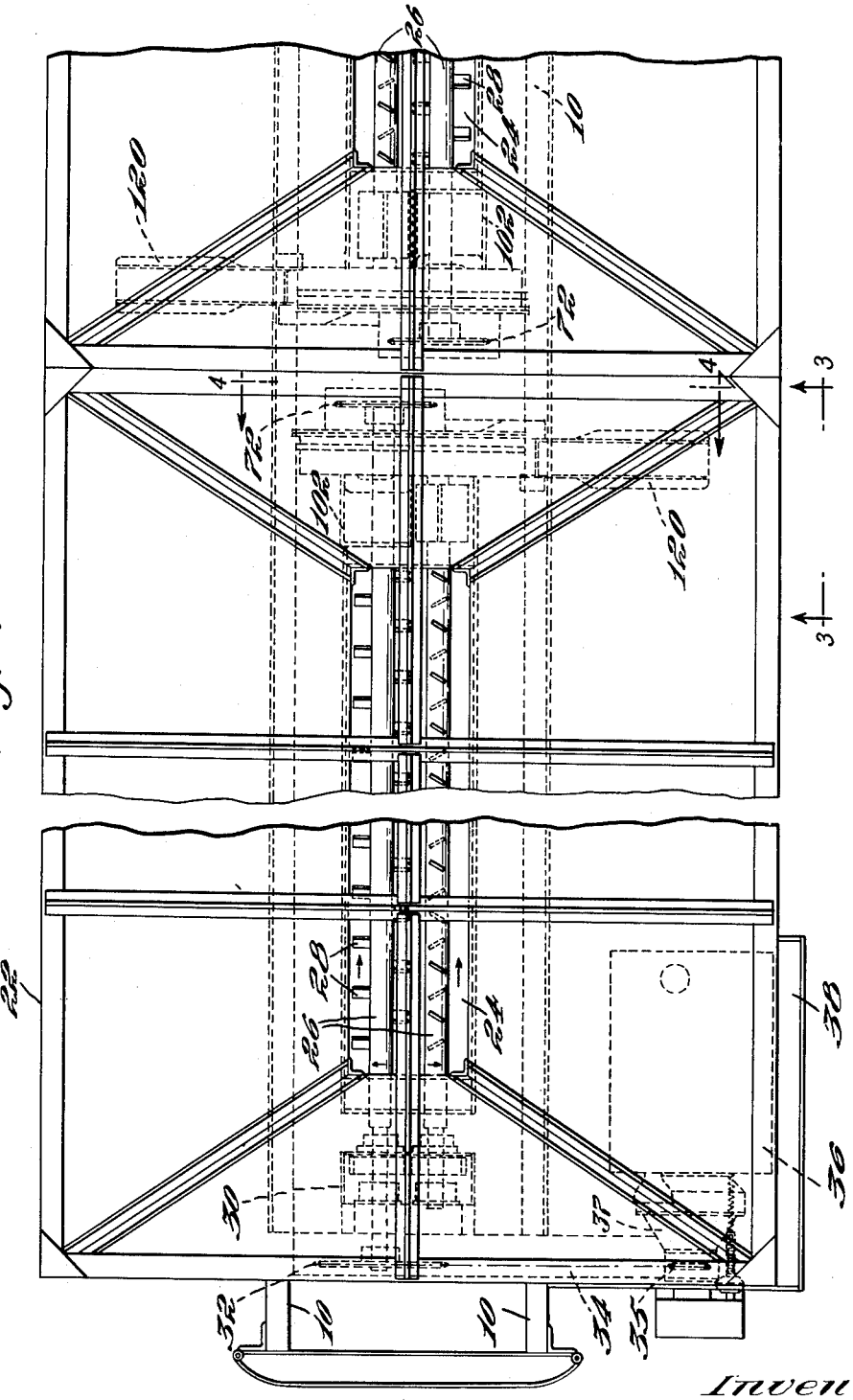
Inventor
Frank E. Underwood
by Roberts, Cushman & Grover
Attys.

March 13, 1956 F. E. UNDERWOOD 2,738,196
SAND SPREADER
Filed Feb. 17, 1951 5 Sheets-Sheet 3
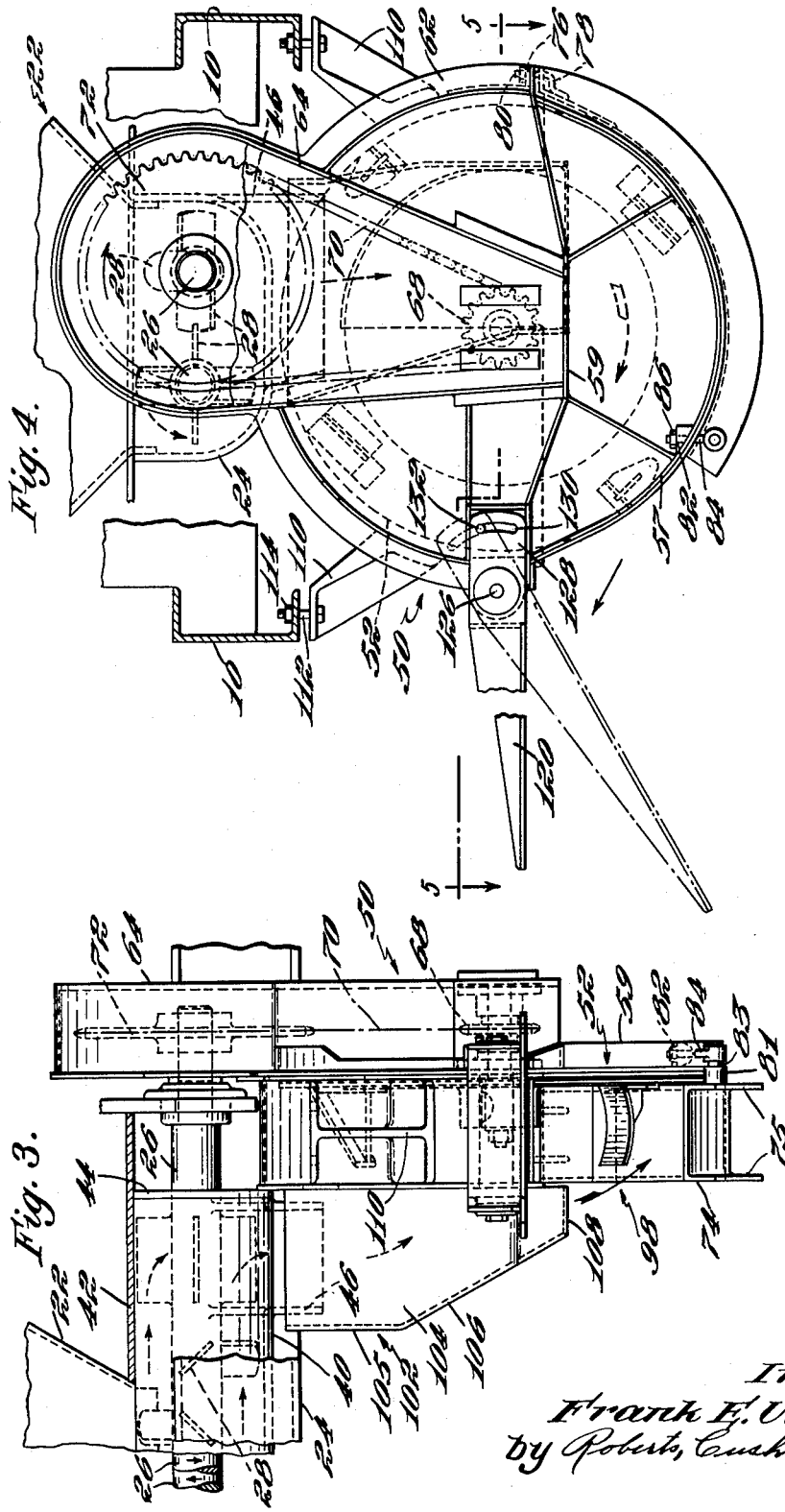
Inventor
Frank E. Underwood
by Roberts, Cushman & Grover
Attys.

March 13, 1956  F. E. UNDERWOOD  2,738,196
SAND SPREADER

Filed Feb. 17, 1951  5 Sheets-Sheet 4

Inventor
Frank E. Underwood
by Roberts, Cushman & Grover
Attys.

March 13, 1956 F. E. UNDERWOOD 2,738,196
SAND SPREADER
Filed Feb. 17, 1951 5 Sheets-Sheet 5

Inventor
Frank E. Underwood
by Roberts, Cushman & Grover
att'ys.

United States Patent Office 2,738,196
Patented Mar. 13, 1956

2,738,196

SAND SPREADER

Frank E. Underwood, Newton, Mass., assignor to Underwood Machinery Company, Boston, Mass., a corporation of Massachusetts Application February 17, 1951, Serial No. 211,494

6 Claims. (Cl. 275—8)

This invention relates to sand-spreading apparatus of the kind shown in my copending application Serial No. 211,493, filed February 17, 1951, and has for its principal objects to provide apparatus of greatly increased capacity both with respect to the amount of sand that can be carried thereby to the place of spreading and as to the distance at which the sand may be projected without sacrificing in any way the advantageous features and construction of the prior apparatus. Further objects are to provide apparatus which may readily be coupled to conventional tractors and the operating parts of which may be controlled from the cab of the tractor.

In my copending application there is shown apparatus for mounting on the chassis of a truck wherein a hopper of comparatively large capacity has in it close to the bottom a paddle-type screw conveyor extending lengthwise thereof far drawing sand from the hopper toward one end and at that end there is a double-acting sand ejector consisting of oppositely rotating impellers to which the sand is delivered. For the size apparatus shown therein, the foregoing construction is not only highly satisfactory but is far superior to any existing equipment now available. There is, however, a need for an even higher capacity machine for servicing extremely large areas very rapidly, for example commercial and military air ports in cases of emergency; accordingly behemoth equipment is imperative. Increasing the size of the prior apparatus is impractical from two standpoints; first, when the hopper size is enlarged by increasing its height and length it is nearly impossible to construct a conveyor that will handle the sand without failure due to the tremendous weight of the sand and the length of sand through which the screw must operate; and secondly, because at the very high speed at which the ejector must rotate in order to project the sand at great distances, it is impossible to make a common housing for the impellers which is rigid enough to withstand the strain and under operating conditions hold the accuracy of clearance necessary for optimum projection.

According to the present invention, the foregoing difficulties have been overcome by mounting two sand hoppers end to end on a common frame which may be coupled to a tractor. Each hopper has its own paddle-type conveyors for drawing sand toward one end thereof and an ejector at that end for receiving the sand and projecting it laterally. As illustrated, the hoppers are arranged so that the conveyors draw the sand toward the adjacent ends of the hoppers and the ejectors are located back to back at the adjacent ends of the hoppers but independently of each other, each to receive sand from a single hopper. In further contrast to the prior equipment, each impeller has its own housing, is single acting in that it projects sand only at one side of the apparatus and there is means for selectively controlling operation of the apparatus so that one or both may be operated at any given time.

In a more specific aspect of the invention each impeller disk, in contrast to the impellers employed in the foregoing application, has impelling members fixed to it comprising two dissimilar pairs of similar members, each member spaced ninety degrees apart, one pair having semi-cylindrical surfaces and the other having plane surfaces facing in the direction of rotation of the impellers, the axes of the center of curvature of the semi-cylindrical surfaces being parallel to a plane normal to the axis of rotation and the plane surfaces being inclined with respect thereto.

The invention will now be described in its various aspects in detail with respect to the accompanying drawings in which:

Fig. 1 is an elevation at one side of my improved sand-spreading trailer coupled to a tractor;

Fig. 2 is a plan view looking directly down into the trailer hopper, the forward hopper being broken away in part and the tractor being omitted;

Fig. 3 is a side elevation, partly in section, to larger scale taken on the line 3—3 of Fig. 2 showing one of the impellers;

Fig. 4 is an end elevation to larger scale taken on the line 4—4 of Fig. 2 showing one of the impellers and its housing;

Fig. 7 is a perspective view of one of the sand ejectors;

Fig. 8 is a perspective view of another of the sand ejectors; and

Figure 5:
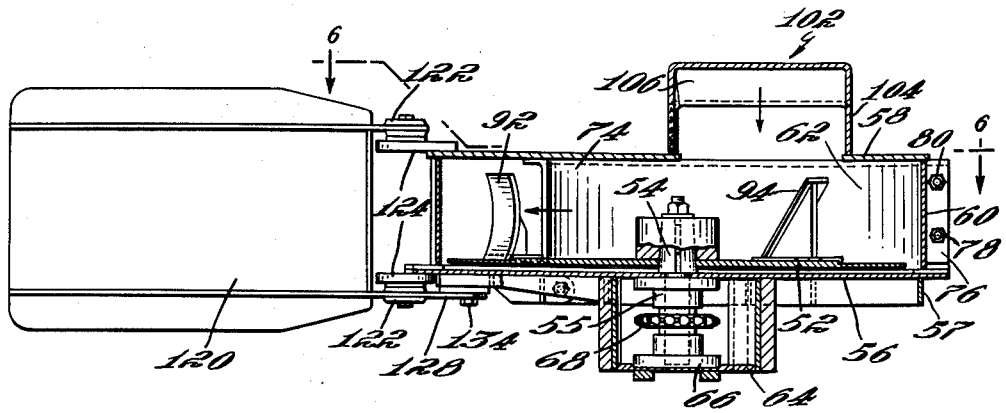
Fig. 5 is a horizontal section through one of the impellers and its housing taken on the line 5—5 of Fig. 4.

Referring now to Figs. 1 and 2 there is shown a tractor-drawn trailer comprising a rigid, substantially rectangular box frame 10 consisting of spaced parallel beams joined by cross bracing in a conventional manner. One end of the frame is supported on a truck 12 having wheels 14 and the other end is detachably supported on the chassis 16 of a tractor 18 which is provided with the usual cab 20. Mounted on the aforesaid frame are two identically constructed hoppers 22—22 disposed end to end, the hoppers having inclined side and end walls and a U-shaped bottom 24 (Fig. 4) in which rotate parallel spaced shafts 26 to which are attached blades 28. The shafts 26 are rotated in opposite directions by gearing 30 (Fig. 2) which in turn is driven by a sprocket 32 fixed to one of the shafts and a chain 34 running over the sprocket 32 and another sprocket 35 driven by a motor 36 through a gear reduction unit 37 and clutch as will appear hereinafter. The motor is mounted on a laterally extending platform 38 fixed to the side of the frame 10. By employing two hoppers 22—22, each of substantially the same capacity as that of my prior machine, a machine of double the capacity may be produced without encountering difficulties with feeding the sand due to conveyor breakage, without having to increase the size of the power plant necessary to operate the apparatus and with economies in use.

The U-shaped bottom 24 of each of the hoppers projects beyond its end wall; that is, the adjacent walls of the hoppers at 40 as shown in Figs. 1 and 3, the projecting portion being closed by a top wall 42 and by an end wall 44 through which the shafts 26 project. An opening is formed in the lower portion of the extension 40 surrounded by a downwardly projecting flange or neck 46.

Mounted between the side rails of the frame 10 and below the adjacent ends of the hoppers are independently operated and independently supplied sand spreading means 50. Each of the sand spreading means comprises a flat disk 52 to which are fastened sand engaging blades which will be described hereafter. Each disk is fixed for rotation to a horizontally disposed shaft 54 journaled in a bearing sleeve 55 fastened to a wall 56 which forms, together with a parallel spaced wall 58 and a curved wall 60 joining the two, a semicylindrical hood 62 housing the upper portion of the impeller. The wall 56 is stiffened by a peripherally extending flange 57 and a number of transversely and radially extending flanges 59 all of which project outwardly substantially at right angles to the plane of the wall. The flanges 59 are concentrated at the lower portion of the wall 56 which extends below the wall 58 and is not afforded the benefit of support from the upper wall 58. Fastened to the wall 56 is a cover member 64 having fixed to its outer wall a bearing sleeve 66 (Fig. 5) in which is journaled the outer end of the shaft 54 and fixed to the shaft 54 between its ends is a sprocket 68 which is driven to rotate the shaft 54 by a chain 70 (Figs. 3 and 4) connecting it to a sprocket 72 fixed to one of the shafts 26. The chain and sprocket 72 are enclosed by the cover 64. Since each housing ejector and its driving mechanism is independent of the other, the operative peculiarities such as vibration and weave due to the high speeds at which the ejectors rotate will not be transmitted to each other, consequently making it easier to hold the close adjustment between the impeller and its tray necessary to procure optimum projection of the sand.

Each housing 62 has fastened below it a curved tray 74 (Fig. 6) the tray being adjustably supported on the housing by bolts. Each tray has a flange 75 or rib extending along each edge of the under side and substantially at right angles to its surface to stiffen it. At one end the curved wall 60 (Figs. 5 and 6) has a horizontal flange 76 to which one end of the tray is secured by bolts 78 passing through the flange and held in place by nuts 80. At the opposite end the tray has a laterally extending boss 81 (Fig. 3) from which projects a pin 83. The head of an eyebolt 84 is placed on the pin and its shank passes upwardly through a boss 82 formed on a portion of the horizontal flange 57 extending from the wall 56 and is retained therein by a nut 86. The foregoing construction permits easy and accurate adjustment of the tray relative to the impellers both to produce optimum conditions of projection for the character of the sand being used at any given time and to take up for wear.

Figure 6:
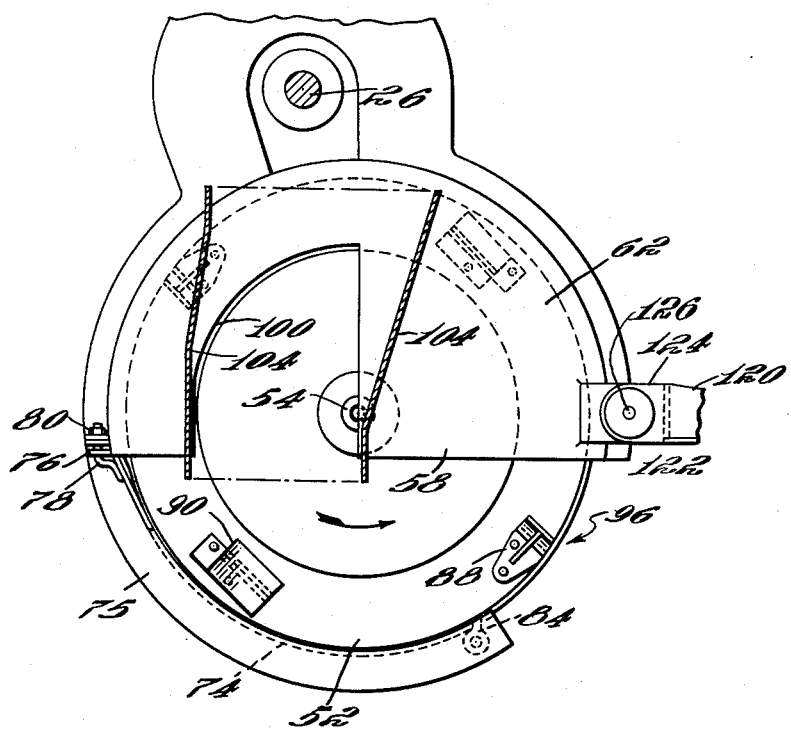
Fig. 6 is a vertical elevation taken on the line 6—6 of Fig. 5.
Figure 9:
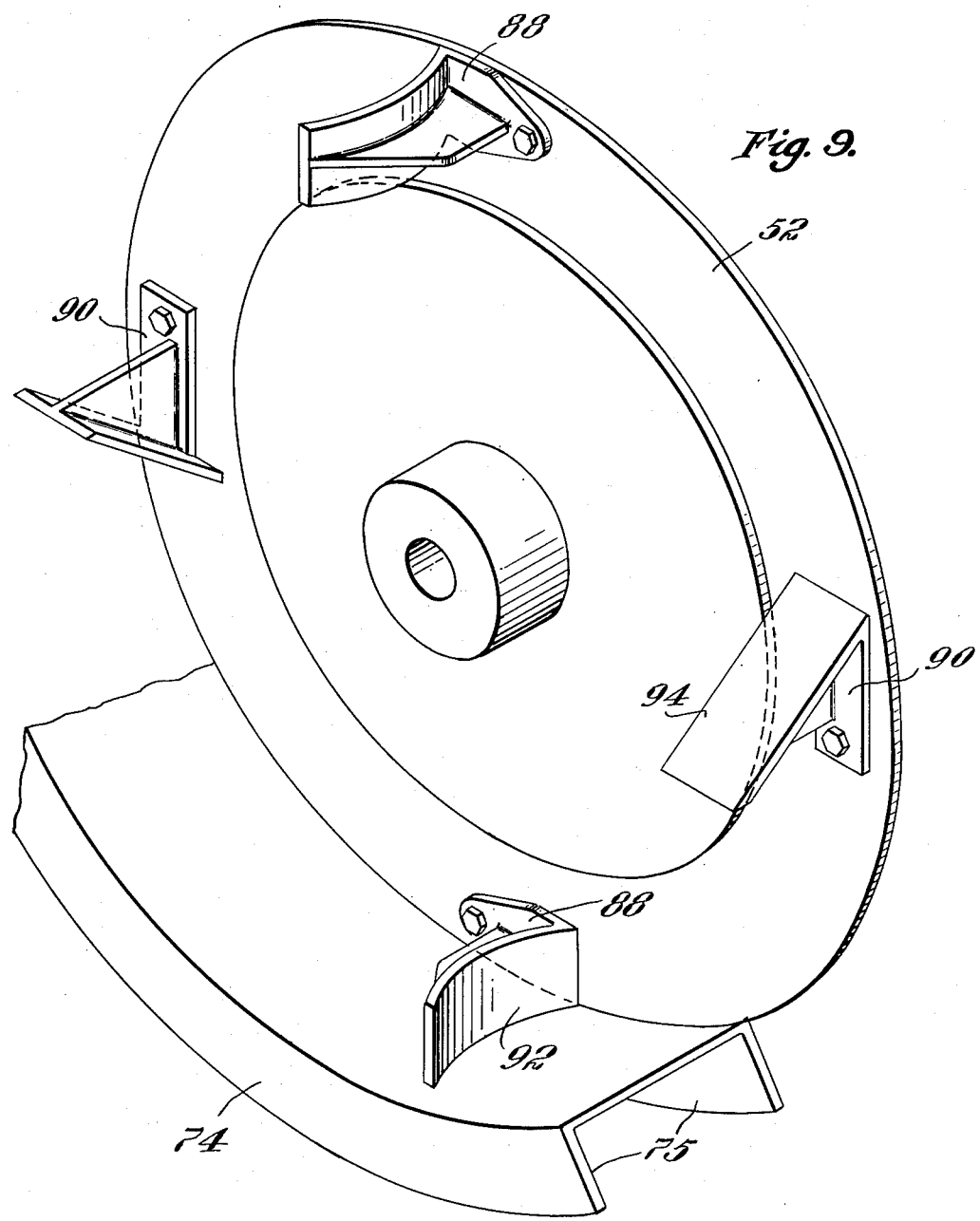
Fig. 9 is an isometric view of a single impeller showing the sand-ejecting elements attached thereto and a portion of the tray at the underside thereof.

As illustrated, each impeller disk 52 has fixed to one face thereof near its periphery, sand-ejecting elements 88 and 90 (Figs. 5 and 9) which are disposed diametrically in pairs ninety degrees apart. The elements 88 and 90 have, as illustrated in Fig. 5, semi-cylindrical and flat surfaces 92 and 94 facing in the direction of rotation of the impeller and adapted to eject sand delivered thereto through lateral openings 96 (Fig. 6) which are located between the lowermost portions of the housings and the terminal portions of the trays 74 and from the open sides 98 of the trays below the walls 58 (Figs. 3 and 6). In contrast to my copending application wherein the flat surfaced elements 90 are mounted radially inward of the curved elements 88, in the present construction the flat surfaced elements 90 alternate with the curved surfaced elements 88 and are fastened to the disk at substantially the same radial distance from its center of rotation as are the curved surface eelments 88 and each in its turn scoops sand from the surface of the tray.

As constructed, the elements 88 extend laterally from the impeller disk across the housing and their semicylindrical surfaces pass through the tray. The outer extremities of the surfaces are close to the surface of the tray and as they move at high speed along the surface of the tray they scoop sand, delivered thereto as will subsequently appear, therefrom and project it laterally through the opening 96 in a high arc at a substantial distance from the side of the trailer, thereby laying a broad band of sand along that side of the vehicle. The impellers of the two sand-spreading devices are rotated in opposite directions and the opening 96 of one is opposite that of the other so that the sand is delivered from one impeller at one side of the vehicle and from the other impeller at the other side of the vehicle.

The elements 90 having the flat surfaces 94 are in like manner situated so that the extremities of their surfaces are close to the surface of the tray and move at high speed along the surface of the tray to operate on the sand in the tray. The surfaces 94 are inclined with respect to the plane of the impeller disk toward the axis of rotation thereof at approximately forty-five degrees although the angle of inclination of this surface may be varied to suit the particular conditions met. The inclined surfaces project some sand laterally through the openings 96 but at a shorter distance and some rearwardly or forwardly as the case may be through the openings 98 so as to fill in the area close to and beneath the trailer. Some sand delivered to the trays 74 is also scattered beneath the trailer by spilling over the open edge of the tray. The advantages of repositioning the sand impeller so that the flat surfaced elements move substantially in the same path as the curved elements is that instead of acting merely on falling sand they act on a definite quantity of sand deposited on the tray which provides a more uniform source and hence a more satisfactory coverage.

Sand is delivered from each hopper 22 to the sand spreading device immediately below it through an opening 100 (Fig. 6) formed in the wall 58 opposite the face of the disk to which the members 88 and 90 are attached by a vertically arranged chute 102 (Fig. 3). Each chute is attached to the wall 58 over the opening 100 and consists of spaced side walls 104 extending outwardly substantially at right angles to the wall 58 and a closing wall which includes a vertical portion 105, an inclined portion 106 and a horizontal portion 108. The upper part of the hopper embraces the depending flange 46 (Fig. 3) which surrounds the opening 40 at the rear end of the hopper so as to receive sand drawn to that end of the hopper by conveyors.

The sand spreading means which consists of the aforesaid impeller disks and their housings are detachably supported between the frame members 10 (Fig. 4) and below the same by laterally and upwardly extending bracket arms 110. The lower ends of the bracket arms are situated between the walls 56 and 58 against the curved wall 60 and are welded thereto. The upper sides of the arms are fastened by bolts 112 and nuts 114 to the frame member 10.

Extending laterally from one side of each housing above the opening 96 is a broad flat deflector plates 120. The plate is adjustable so as to control to some extent the trajectory of the sand. As illustrated, the plate is paddle-shaped and has at its inner end spaced hub members 122. Fastened to the wall of the housing and projecting substantially horizontally therefrom are spaced arms 124 through the outer ends of which are placed bolts 126 for pivotally supporting the hubs 122 so that the paddle may be tilted about its inner end on a substantially horizontal axis. Extending inwardly from one of the hubs 122 (Fig. 4) is an arm 128 having an arcuate slot 130 therein through which projects a pin 132 fixed to the wall 56. The end of the pin is threaded for reception of a nut 134 which may be turned up tight on the pin against the arm to hold the deflector at any desired position of adjustment.

Each of the hoppers 22, its sand conveyor and sand ejector means, is provided with a motor 36 (Fig. 1) and these motors as illustrated herein are arranged to be independently operated and controlled from the cab 20 of the tractor. To this end each motor is connected to the gearing 30 for rotating the shafts 26 by way of a clutch 136, the clutch in turn being operable through an arm 138 and hydraulic piston connection 140 from a control valve block 142 and valve control arm 144 in the cab. The hydraulic piston connection is detachably coupled by way of tubing 146 on the trailer and tubing 148 on the tractor by automatic couplings 150 so that the tractor may readily be uncoupled from the trailer after it is exhausted of sand and replaced by a filled trailer. Actuation of the control arm 144 will serve to clutch or declutch the motor to the gearing 30.

It should be understood that the present disclosure is for the purpose of illustration only and that this invention includes all modifications and equivalents which fall within the scope of the appended claims.

I claim:

1. A sand spreading trailer arranged to be coupled to a tractor comprising a rigid frame, large capacity hoppers mounted on said frame end to end in tandem relation, sand conveyors in said hoppers operable to draw sand therein toward the adjacent ends of the hoppers, a horizontally supported shaft below each hopper, said shafts having a common axis of rotation, a sand impeller fast to each shaft, said impellers being in the form of disks arranged in axially spaced, parallel relation with adjacent surfaces facing each other and opposite surfaces facing away from each other, elements carried by the opposite surface of each impeller disk for ejecting sand delivered thereto transversely in a direction substantially parallel to the plane of the disk, the elements on one disk ejecting the sand at one side of the trailer and the elements on the other disks ejecting the sand at the opposite side of the trailer, additional elements carried by the opposite surfaces of each propeller disk for ejecting sand delivered thereto longitudinally in a direction substantially perpendicular to the plane of the disk, the additional elements on one disk ejecting sand forwardly and the additional elements on the other disk ejecting the sand rearwardly and means for effecting operation of the conveyor and ejector of each hopper independently of the other, said means being controlled from the tractor.

2. A sand spreading trailer arranged to be coupled to a tractor comprising a rigid frame, large capacity hoppers mounted on said frame end to end in tandem relation, conveyors in said hoppers operable to draw sand therein toward the adjacent ends of the hoppers, a sand impeller below each hopper at the adjacent ends of the hoppers for receiving sand delivered by the conveyors to these ends, horizontal, forwardly and rearwardly extending supporting shafts to which the sand impellers are fixed for rotation in opposite directions, said impellers being in the form of disks arranged in axially spaced, parallel relation with their adjacent sides facing each other and their opposite sides facing away from each other, each impeller having elements fast to its opposite side, the elements carried by one impeller ejecting sand in a plane substantially parallel to the plane of the disk transversely to the axis of rotation thereof to one side of the trailer and longitudinally in a direction substantially perpendicular to the disk and in a forward direction, and the elements carried by the other impeller ejecting sand in a plane substantially parallel to a plane transversely of the axis of rotation thereof to the opposite side of the trailer and longitudinally in a direction substantially perpendicular to the disk and in a rearward direction, independent sources of power, a clutch operably connecting each of said conveyors and impellers to one of said sources of power to effect operation of each one as a unit, and means in the cab of the trailer for selectively effecting operation of the clutches.

3. A sand spreading trailer comprising a rigid frame having spaced supporting wheels at one end and means at its opposite end for coupling it to a tractor, including a control cab, large capacity hoppers mounted on said frame end to end in tandem relation, sand conveyors in said hoppers operable to draw sand therein toward the adjacent ends, a sand impeller below each hopper at the adjacent ends of the hoppers for receiving sand delivered by the conveyors to these ends, horizontally supported shafts, means supporting the shafts below the hoppers in horizontally aligned positions for rotation about a common axis extending forwardly and rearwardly with respect to the trailer, sand impellers fixed to the shafts for rotation in opposite directions, said impellers being disks arranged in axially spaced, parallel relation on the respective shafts with adjacent sides facing each other and opposite sides facing away from each other, sand ejecting elements fast to each impeller, said sand ejecting elements being spaced peripherally thereof, alternate ones of said elements having surfaces facing in the direction of rotation of the disks to which they are attached for ejecting sand substantially to the surface of the disk in a direction transversely of the axis of rotation, said alternate ones of said elements on one disk throwing the sand outwardly from one side of the trailer and said alternate ones of said elements on the other disk throwing the sand outwardly from the opposite side of the trailer, intermediate ones of the elements having flat surfaces inclined to the axis of rotation for ejecting sand longitudinally, substantially parallel to the axis of rotation, the intermediate ones of said elements on one disk throwing the sand forwardly and the intermediate ones of said elements on the other disk throwing the sand rearwardly, a motor, a clutch connecting each conveyor and impeller to a motor to effect operation of the same as a unit, means for selectively controlling the clutches from the cab of the trailer, and coupling means between the trailer and the tractor for connecting said control means to said clutches.

4. In a sand spreader, an impeller including a disk, a shaft supporting the disk for rotation about a horizontal axis perpendicular to the plane of the disk, sand impelling members fixed to said impeller disk comprising two dissimilar pairs of diametrically disposed similar members, the members being arranged ninety degrees apart, one pair having semi-cylindrical surfaces and the other flat surfaces, said semi-cylindrical and flat surfaces facing in the direction of rotation of the impeller, with the axis of the center of curvature of each semi-cylindrical surface parallel to a plane normal to the axis of rotation and the plane of each of the flat surfaces inclined thereto, and means for effecting rotation of said impeller.

5. A sand spreader comprising a rigid frame, large capacity hoppers mounted on the frame end to end in tandem relation, sand conveyors in said hoppers operable to draw sand therein toward the adjacent ends of the hoppers, a sand impeller below each hopper at the adjacent ends of the hoppers for receiving the sand delivered by the conveyors to these ends, a shaft supporting each impeller for rotation about a horizontal axis, power operated means for effecting operation of each sand impeller, said impellers being in axially spaced, parallel relation and each carrying means for impelling sand transversely of the axis of rotation and longitudinally of the axis of rotation, the means effecting transverse ejection of the sand on one impeller throwing the sand outwardly from one side of the spreader, the means effecting transverse ejection of the sand on the other impeller throwing the sand outwardly from the opposite side of the spreader, the means effecting longitudinal ejection of the sand on one impeller throwing the sand forwardly, and the means effecting longitudinal ejection of the sand on the other impeller throwing the sand rearwardly, and means operable from one end of the spreader for independently controlling operation of said power operated means.

6. In a sand spreader, an impeller disk, a rotatable shaft to which the disk is fixed for rotation about a horizontal axis, sand impelling members fast to said impeller disk comprising dissimilar pairs of similar members uniformly spaced about the periphery of the disk, the members of one pair of similar members having semi-cylindrical surfaces and the members of the other pair of similar members having flat surfaces, said semi-cylindrical and flat surfaces facing in the direction of rotation of the impeller disk, the axis of the center of curvature of each semi-cylindrical surface being parallel to a plane normal to the axis of rotation and the plane of each flat surface being inclined thereto and means for effecting rotation of said impeller.

References Cited in the file of this patent

UNITED STATES PATENTS

| | | |
|---|---|---|
| 186,410 | Buist et al. | Jan. 23, 1877 |
| 1,000,004 | Huber | Aug. 8, 1911 |
| 1,440,429 | Williams | Jan. 2, 1923 |
| 2,092,102 | Wilson | Sept. 7, 1937 |
| 2,200,165 | Fulkerson et al. | May 7, 1940 |
| 2,281,212 | Stoltzfus | Apr. 28, 1942 |
| 2,303,876 | Gaddis | Dec. 1, 1942 |
| 2,430,020 | Johnson | Nov. 4, 1947 |
| 2,487,552 | Humphrey | Nov. 8, 1949 |

FOREIGN PATENTS

| | | |
|---|---|---|
| 560,687 | Great Britain | Apr. 14, 1944 |